United States Patent [19]
Schmid et al.

[11] Patent Number: 5,972,107
[45] Date of Patent: Oct. 26, 1999

[54] METHOD FOR PURIFYING SILICON

[75] Inventors: Frederick Schmid, Marblehead; Chandra P. Khattak, Danvers, both of Mass.

[73] Assignee: Crystal Systems, Inc., Salem, Mass.

[21] Appl. No.: 08/919,895

[22] Filed: Aug. 28, 1997

[51] Int. Cl.[6] .................................................. C30B 23/06
[52] U.S. Cl. .......................... 117/79; 117/204; 117/206; 422/245.1
[58] Field of Search .................................. 117/200, 204, 117/206; 422/245.1; 423/348

[56] References Cited

U.S. PATENT DOCUMENTS

| | | | |
|---|---|---|---|
| 4,456,480 | 6/1984 | Wintenberger | 75/63 |
| 4,684,513 | 8/1987 | Iya | 423/349 |
| 4,747,906 | 5/1988 | Shingu et al. | 156/624 |
| 4,818,495 | 4/1989 | Iya | 422/145 |
| 4,837,376 | 6/1989 | Schwirtlich et al. | 423/348 |
| 4,900,532 | 2/1990 | Kurz et al. | 423/348 |
| 5,182,091 | 1/1993 | Yuge et al. | 423/348 |
| 5,208,001 | 5/1993 | Truitt et al. | 423/348 |

FOREIGN PATENT DOCUMENTS 0 459 421  12/1991  European Pat. Off. .
02267110  10/1990  Japan .

OTHER PUBLICATIONS

Baba, H. et al., 13th European Photovoltaic Solar Energy Conference Oct. 23–27, 1995, Nice, France, Metallurgical Purification for Production of Solar Grade Silicon from Metallic Grade Silicon, pp. 390–394.

Khattak, C. P. et al., The Electromechamical Society, Inc., Fall Meeting, Denver, Colorado, Oct. 11–16, 1981, Refinement of MG Silicon by HEM for Photovoltaic Applications, pp. 1137–1138.

*Primary Examiner*—Felisa Hiteshew
*Attorney, Agent, or Firm*—Hale and Dorr LLP

[57] ABSTRACT

An apparatus for purifying metallurgical grade silicon to produce solar grade silicon has a container for holding molten silicon and one or more submergible torches for providing a flame surrounded by inert gas to heat the molten silicon so that the reaction time is prolonged, to create turbulence, and to introduce silica powder and water vapor for reactions with molten silicon. The molten silicon is then directionally solidified by providing the container in a coolant tank and controlling the coolant level with controllable valves so that further purification is achieved by segregating impurities.

19 Claims, 1 Drawing Sheet

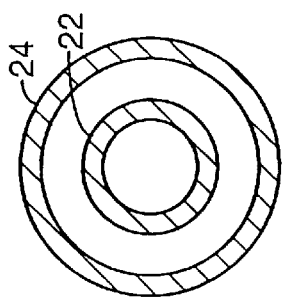
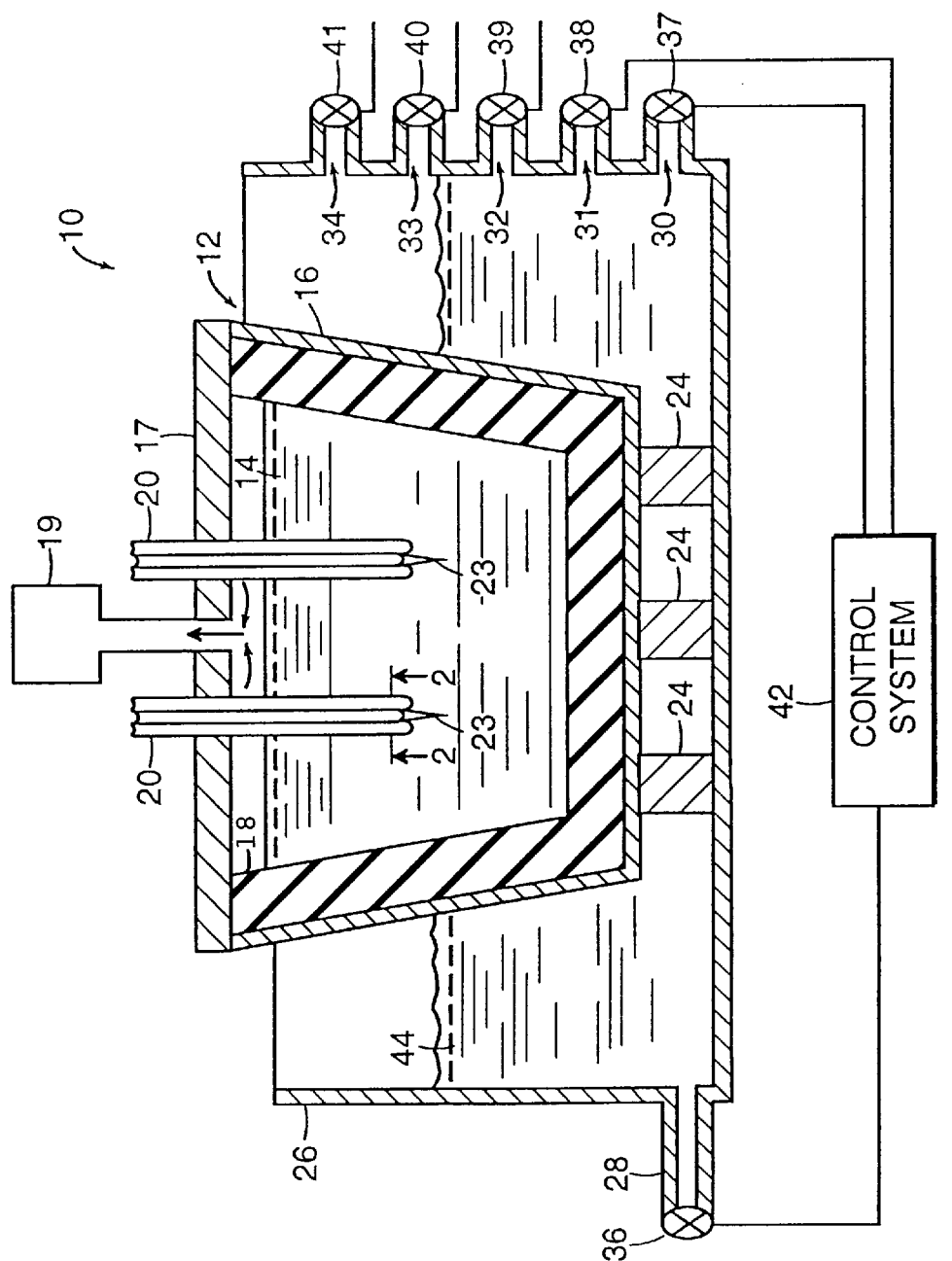

METHOD FOR PURIFYING SILICON

BACKGROUND OF THE INVENTION

The present invention relates to the purification of metallurgical grade silicon to produce solar grade silicon.

Silicon that is used in the manufacture of solar cells must have a minimum purity that is referred to here as solar grade (SG) silicon. SG silicon has significantly higher purity than a lower metallurgical grade (MG) silicon, although solar grade can be lower than electronic grade (EG) silicon, which is used for manufacturing semiconductor devices. While MG silicon can have up to 10,000 ppm of impurities and EG silicon requires less than 1 ppb of donor or acceptor impurities, SG silicon should have no more than 5 ppm of metallic impurities.

To remove from a batch of silicon impurities that have low segregation coefficients, it is well known to provide directional solidification so that the impurities with low segregation coefficients can be segregated to the last part of the melt to solidify these impurities for removal. To remove impurities with high segregation coefficients, however, particularly boron and phosphorus, MG silicon is typically converted to a gaseous product and then purified by distillation.

A number of efforts have been made to efficiently produce SG silicon as an intermediate grade between MG silicon and EG silicon. In U.S. Pat. No. 5,182,091, for example, MG silicon is heated to a molten state in a refractory-lined crucible with a heating coil wrapped around it. A high-temperature, high-velocity plasma jet directs an inert gas with steam and/or silica powder from a height of 50 mm to produce a hot spot where boron and carbon escape. In an article by Baba, et al, "Metallurgical Purification for Production of Solar Grade Silicon from Metallic Grade Silicon," a rather costly four-step process is described for refining small quantities of MG silicon. With this process, phosphorous is removed with an electron beam gun and the silicon melt is directionally solidified. Then, boron and carbon are removed by blowing argon plasma with water vapor into the melted silicon, and a second directional solidification process is performed. This process requires an hour to remove phosphorus and boron from just a few kilograms of liquid silicon.

Other efforts have been made to produce SG silicon with methods that would provide lower cost than that required to produce EG than silicon. Such efforts have involved using higher purity raw materials in an arc furnace, acid leaching, reactive gas treatments in a molten state, slagging, and dissolution of MG silicon in a metal followed by recrystalization. None of these processes, however, has effectively removed a sufficient amount of impurities, particularly boron and phosphorous, in a cost-effective manner.

It would be desirable to have an efficient method for purifying large amounts of MG silicon to produce SG silicon.

SUMMARY OF THE INVENTION

The present invention includes methods and apparatus for efficiently purifying MG silicon to produce SG silicon. In one aspect of the present invention, a system for purifying MG silicon includes a container for holding molten silicon, and a heater that can be immersed in the molten silicon. The immersion heater preferably includes an oxygen-hydrogen torch that has a flame surrounded by an inert gas, such as argon, so that the torch provides heat, water vapor, and the inert gas. The inert gas provides space for the flame, and also can be used to carry silica ($SiO_2$) powder to the flame and generate turbulence within the molten silicon.

The container can also include a system for directionally solidifying the melt, e.g., with a cooling system that includes a tank in which the container is held, an inlet for providing a coolant, a plurality of outlets at different vertical positions relative to the container, and a controller for controlling the physical vertical level of the coolant. Alternatively, the melt can be provided into another container for directional solidification, with or without a vacuum.

Accordingly, the method includes prolonging the reaction time for the purification while the silicon is in a molten state, and following this prolonged reaction time with directional solidification, with our without evacuation.

In another aspect of the present invention, a method includes steps of submerging an immersible heater, such as a torch, within molten silicon to heat the molten silicon, and preferably also to provide inert gas to permit combustion to generate heat and water vapor and to carry silica powder and to create turbulence to expose more silicon. The torches are preferably submerged near the bottom of the container, and as processing continues, are raised within the container to assist with directional solidification. A directional solidification step can include raising the torches in a vacuum environment, and also preferably includes a step of controlling coolant valves that control the amount of contact between the container and the coolant.

In another aspect, the invention includes a method of maintaining molten silicon in a liquid state and purifying the molten silicon by stirring, slagging, reaction with moisture, oxidation, evacuation, and reduction.

The present invention provides an effective and efficient mechanism for purifying molten MG silicon to produce SG silicon, in a way that can be done on a large scale as the MG silicon is being produced. The method includes purifying the silicon with chemical reactions so that products are volatilized or entrapped in slags, enhancing the reaction rate by heating and stirring the melt, prolonging the reaction by providing a heat source to keep the silicon in the molten state longer, and controlling the solidification to enhance the purification by the effects of segregation. By using submerged torches, the torches provide heat, turbulence, water vapor, silica powder, and inert gas, all of which are useful and/or necessary in the purification of molten silicon. In the torches, the oxygen/hydrogen ratio can be controlled to optimize chemical reactions. While the torches can be used in conjunction with other heating sources, such as a coil, the torches preferably replace any other heat source and are thus used as the sole heating source for the molten silicon. Other features and advantages will become apparent from the following detailed description, drawings, and claims.

BRIEF DESCRIPTION OF THE DRAWINGS

FIG. 1 is a part cross-sectional, part side view of a ladle in which silicon is purified according to the present invention.

FIG. 2 is a cross-sectional view illustrating a torch used to heat silicon in the ladle.

DETAILED DESCRIPTION

Referring to FIG. 1, a system 10 for purifying MG silicon has a ladle 12 for holding molten silicon 14. Ladle 12 has a container 16, an inner lining 18, which is preferably a ceramic, such as high purity silica, and a tightly fitting insulating cover 17 with an exhaust system 19. The ladle can preferably hold about 1 to 2 metric tons at one time, and preferably is provided near an arc furnace where MG silicon is produced, so that the system of the present invention can be used to purify the MG silicon soon after it is manufactured.

Extending downwardly into molten silicon 14 from above are a number of immersion heaters, such as oxygen-hydrogen torches 20. Torches 20 provide heat and generate turbulence in the molten silicon. Referring also to FIG. 2, torches 20 have an inner tube 22 with an oxygen-hydrogen flame 23 that is surrounded by argon gas delivered through an outer tube annular 24 that surrounds the flame from inner tube 22 to protect flame 23. Torch 20 is thus similar in principle to torches used for underwater cutting. Outer tube 24 is made of a ceramic material, such as fused silica or alumina, and the pressure from the molten silicon is balanced by the gas. The inert gas can also be a carrier for silica powder, an important known catalyst for purification. The flame is hot is, for example, 2000° C., which is significantly higher than the melting point of silicon (1412° C.). The inert gas can also keep the touch cool, and for this purpose helium could also be used.

The user can control a number of parameters as desired. The flame rate and the oxygen/hydrogen ratio to the torches 20 can be controlled to control the oxidation or reducing conditions and the turbulence and oxidation conditions in the area of the flame and thus to expose more molten silicon 14 to the flame; the inert flow rate of the inert gas can be controlled to control the area of water concentration exposed to the flame; the heat in the ladle can be controlled by the size and number of torches, and also by the flame rate; and the amount of silica being introduced is controllable. With proper control, the silicon can thus be maintained in a molten state as long as necessary for purification to occur, typically about one-half day to one day.

The submerged torches are preferably the sole sources of heating for the molten silicon. Alternatively, however, other heating sources can be used in conjunction with the torches, such as the heating coil around the outside of the container as is used with known crucibles.

Stirring of molten silicon with argon gas promotes a reaction between silicon (Si) and silica ($SiO_2$) to form silicon monoxide (SiO), which itself is gaseous and promotes more stirring. The silica also reacts with oxides and hydrides to trap impurities in slags, combines with SiC to encourage reactions that incorporate the carbon into gaseous molecules that can be exhausted, and may help with oxidation of boron. The moisture and oxidizing condition oxidizes the phosphorous, boron, and other impurities to form a slag and thereby to trap these impurities in the slag. The resulting impurity compounds include FeO, $Fe_2O_3$, CaO, $TiO_2$, $Ti_2O_3$, SiO, $SiO_2$, $P_2O_3$, $P_2O_5$, and $B_2O_3$. Volatile products can also be brought to the surface of the melt and then evacuated with the exhaust system; such volatile products include SiO, $BH_3$, $P_2O_5$, and TiO. Reaction with the hydrogen in the water in reducing conditions reduces impurities by forming $PH_3$, $BH_3$, SiH, and $SiH_3$.

After heating for a sufficient period of time, the melt is directionally solidified—directional solidification is a known effective method for removing impurities that have low segregation coefficients, and thus are incorporated in the last melt to solidify. A number of methods can be used in the ladle itself or in a separate container. In one method and apparatus for controlling such solidification, the container is mounted in a tank with conduits having controllable valves. Container 16 rests on pedestal supports 24 in a tank 26 that has one inlet 28 for bringing in a fluid coolant 44, such as water, and multiple outlets 30–34 at separate vertical heights. Inlet 28 and each outlet 30–34 has a respective valve 36–41 that can be controlled with a control system 42. Control system 42 can include an appropriately programmed general purpose computer or an application-specific integrated circuit (ASIC). The water level in the tank is raised and lowered by selectively closing the outlet valves. (In FIG. 1, valves 36,40, and 41 are shown open while valves 37–39 are closed.) Flowing water through tank 26 thus causes the silicon melt to solidify directionally from bottom to top over the course of time. Valve 40 is closed when the solid liquid interface is approximately at that position.

To further assist with such directional solidification, the torches 20 are initially submerged deep into molten silicon 14 in the container, preferably near the sides where heat is most easily lost. Torches 20 are then raised until they are near the top of the container while the solid-liquid interface moves upwardly due to the coolant. When this interface nears the top of container 16, torches 20 are removed while water continues to flow to cool the solidified silicon ingot rapidly to the ambient temperature. A resulting cooled ingot of silicon is removed from ladle 12, thus causing lining 18 to break up. Crucible 16 therefore has to be relined for a next batch of silicon. Because impurities segregate in the top of the ingot during the directional solidification process, the top layer is removed and the purer silicon below the top layer may be used as melt stock or further refined to EG silicon using a known Siemens process, modified to require fewer distillation steps than are typically used.

To provide the higher grade SG silicon at an early stage where MG silicon is produced, this process can be implemented in an MG silicon manufacturing plant. In this case, an arc furnace in which the MG silicon is first manufactured is provided together with a ladle where the additional purification is performed to effectively produce a two-step process of manufacture and purification. In this case, the silicon can be poured directly from the arc furnace to the ladle for large scale purification, thereby upgrading the quality of the silicon at the source of its manufacturer, and at a greatly reduced cost.

Having described embodiments of the present invention, it should be apparent that modifications can be made without departing from the scope of the invention as described by the appended claims. For example, the molten silicon in the ladle can be poured into a separate mold where directional solidification can be performed. Other methods can be used for such directional solidification, including a heat exchanger method in which a heat is extracted from a central portion of the bottom of a crucible, e.g., with a helium-cooled molybdenum heat exchange. The purification process could be carried out outside the MG silicon plant by remelting the MG silicon; however, the approach of using molten silicon directly from the arc furnace will not require additional energy to remelt the MG silicon.

What is claimed is:

1. A method for purifying silicon comprising:

submerging a first immersion heater in a container of molten silicon, the heater producing sufficient heat to keep the silicon in a molten state; and directionally solidifying the molten silicon in the container.

2. The method of claim 1, wherein the container is in a tank that has a fluid inlet with a valve for bringing a cooling fluid into the tank, and a plurality of outlets with a plurality of respective valves for carrying the cooling fluid from the tank, directionally solidifying including controlling the outlet valves to maintain a water level within the tank.

3. The method of claim 1, wherein the submerging includes submerging a first torch that has an oxygen-hydrogen frame while introducing an inert gas that surrounds the flame at the end of the first torch.

4. The method of claim 3, wherein the directionally solidifying includes raising the submerged torches within the container.

5. The method of claim 3, further comprising submerging a second torch, similar to the first torch, in the container of molten silicon.

6. The method of claim 3, wherein the submerging includes introducing water vapor and inert gas into the molten silicon.

7. The method of claim 6, wherein the submerging further includes introducing silica powder into the molten silicon with the inert gas.

8. The method of claim 7, wherein the purification of the silicon in the molten state is achieved by chemical reactions with the silica powder and water vapor so that the resultant products are vaporized and trapped in a slag.

9. A method for purifying silicon comprising:
heating a container of molten silicon, the container resting in a tank that has a fluid inlet with a valve and plurality of outlets with a plurality of respective valves for carrying the fluid from the tank; and
directionally solidifying the container of molten silicon by controlling the valves to control a level of fluid within the tank.

10. The method of claim 9, wherein the heating includes submerging a plurality of immersion heaters in the container to maintain the silicon in a molten state, directionally solidifying to further purify the silicon by segregation including raising the heaters within the container and controlling the valves to cause the level of fluid to be raised.

11. A method for purifying molten silicon, the method comprising:
maintaining silicon in a molten state;
purifying the molten silicon by a combination of stirring, slagging, reaction with moisture, oxidation, evacuation, and reduction; and
directionally solidifying the molten silicon.

12. A method including purifying the molten silicon by a combination of stirring, slagging, reaction with moisture, oxidation, evacuation, and reductions.

13. A method for purifying silicon comprising submerging a first immersion heater in a container of molten silicon to keep the silicon in a molten state.

14. The method of claim 13, wherein the submerging includes submerging a first torch that has an oxygen-hydrogen frame while introducing an inert gas that surrounds the flame at the end of the first torch.

15. The method of claim 14, further comprising submerging a second torch, similar to the first torch, in the container of molten silicon.

16. The method of claim 13, wherein the submerging includes introducing water vapor and inert gas into the molten silicon.

17. The method of claim 16, wherein the submerging further includes introducing silica powder into the molten silicon with the inert gas.

18. The method of claim 13, wherein the submerging further includes introducing silica powder into the molten silicon with the inert gas.

19. The method of claim 17, wherein the silicon is purified by chemical reactions with the silica powder and water vapor so that the resultant products are vaporized and trapped in a slag.

* * * * *